(12) United States Patent
Duranton et al.

(10) Patent No.: US 6,370,595 B1
(45) Date of Patent: Apr. 9, 2002

(54) METHOD OF ADDRESSING A PLURALITY OF ADDRESSABLE UNITS BY A SINGLE ADDRESS WORD

(75) Inventors: Marc Duranton, Boissy Saint Leger; Loic Geslin, Paris; Valerie Vier, Vincennes; Bernard Bru, Limeil Brevannes, all of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/280,107

(22) Filed: Mar. 29, 1999

(51) Int. Cl.$^7$ .......................... G06F 13/00; G06F 13/14
(52) U.S. Cl. .................. 710/3; 710/4; 710/9; 710/26; 710/36; 710/129
(58) Field of Search .............................. 710/3, 129, 36, 710/9, 4, 26

(56) References Cited

U.S. PATENT DOCUMENTS

| | | | | |
|---|---|---|---|---|
| 4,315,310 A | * | 2/1982 | Bayliss et al. | 364/200 |
| 4,400,774 A | * | 8/1983 | Toy | 364/200 |
| 4,821,171 A | * | 4/1989 | Calamari | 364/200 |
| 5,454,092 A | * | 9/1995 | Sibigtroth | 395/412 |
| 6,240,501 B1 | * | 5/2001 | Hagersten | 711/202 |

\* cited by examiner

*Primary Examiner*—Thomas Lee
*Assistant Examiner*—Rehana Perveen

(57) ABSTRACT

A method is described for addressing units (FU1, FU2, FU3) amongst a plurality of units having different addresses (ADD1, ADD2, ADD3) by use of an address word (AW), the addresses and the address word being composed of address elements. A tag word (TW) is transmitted to the plurality of units, the tag word defining which address elements of the address word are significant (S) and which address elements of the address word are non significant (X). The address word and the addresses of the units are compared and, a unit is addressed if the significant elements of the address word match the corresponding elements of the unit's address.

3 Claims, 2 Drawing Sheets

METHOD OF ADDRESSING A PLURALITY OF ADDRESSABLE UNITS BY A SINGLE ADDRESS WORD

FIELD OF THE INVENTION

The present invention concerns a method of addressing units amongst a plurality of units having different addresses by means of an address word, the addresses and the address word being composed of address elements.

The invention also concerns a corresponding system for carrying out the method. The invention may be used in applications related to Multimedia.

BACKGROUND ART

U.S. Pat. No. 5,724,529 describes a computer system comprising means for addressing individual sockets. A PC card controller is associated to a group of sockets, addressed by a processor through an address bus. The controller has a socket pointer that uniquely identifies a socket among a plurality of sockets. A socket is addressed when at least a portion of the pointer information matches a portion of the transmitted address. The system disclosed allows addressing of one unit (socket) at a time. Each address word transmitted from the processor permits the addressing of a single unit. In the case of the addressing of several units with different addresses, the addresses need to be transmitted in series, one at a time. This method of addressing results in long delays when addressing several units.

SUMMARY OF THE INVENTION

It is an object of the invention to ameliorate existing addressing methods by allowing greater flexibility and greater speed in addressing.

To this end, the method such as defined in the preamble comprises the steps of:

transmitting a tag word to the plurality of units, the tag word defining which address elements of the address word are significant and which address elements of the address word are non significant;

comparing the address word and the addresses of the units, a unit being addressed if the significant elements of the address word match the corresponding elements of the unit's address.

This method thus allows addressing of several units at a time by means of a single address word. An advantage of this method is time-efficiency because, in one addressing cycle, several units can be addressed simultaneously without having to address individually and in series each unit. Furthermore the method permits to address at a time an arbitrary group of units among the plurality of units. Thus, advantages of the method are a greater flexibility and a greater speed in addressing.

The invention also relates, for carrying out the method, to a system having:

a plurality of addressable units having different addresses, the addresses being composed of address elements, wherein the system also comprises an addressing unit for generating an address word composed of address elements and an associated tag word, the tag word defining which address elements of the address word are significant and which address elements of the address word are non significant;

a bus system for conveying the address word and the associated tag word to the addressable units;

a decoder being associated to each addressable unit for comparing the address word and the address of the unit, the unit being addressed if the significant elements of the address word match the corresponding elements of the unit's address.

BRIEF DESCRIPTION OF THE DRAWINGS

The particular aspects of the invention will now be explained with reference to the embodiments described hereinafter and considered in connection with the accompanying drawings, in which.

DETAILED DESCRIPTION OF THE INVENTION

Figures 1, 2:
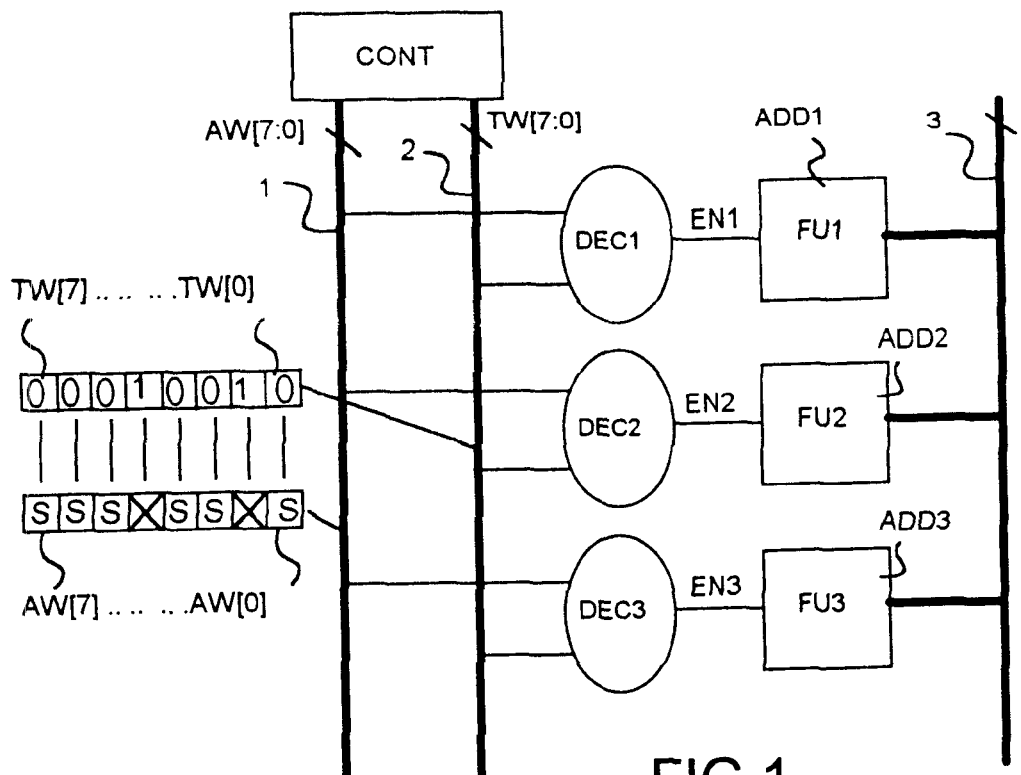
FIG. 1 is a block diagram of a system implementing a method of addressing in accordance with the invention.
FIG. 2 shows a practical example of the method.

FIG. 1 depicts a system comprising three addressable and independent functional units FU: FU1, FU2, FU3. Each unit has its own address, respectively ADD1, ADD2, ADD3. A controller CONT addresses the units FU by means of an address bus 1 transmitting an address word AW[7:0]. In parallel to this address word AW, the controller CONT transmits on a separate tag bus 2 a tag word TW[7:0] associated with the address word. In this embodiment of the invention the units' addresses, the address word and the tag word are composed of 8 binary elements or bits. In another embodiment of the invention the tag word may be transmitted in series with the address word AW on the address bus or the tag word may be joined to the address word.

Each unit FU is associated with a decoder DEC that receives both the address word AW and the tag word TW. The decoder DEC1, DEC2, DEC3 compares the two words with the address of the corresponding unit ADD1, ADD2, ADD3 respectively, and determines whether the corresponding unit is addressed or not. The decoder conveys to the unit FU1, FU2, FU3 a signal EN1, EN2, EN3, respectively of value 1 when the unit is addressed otherwise EN1, EN2, EN3 is 0.

The tag word TW associated to the address word AW defines significant bits and non-significant bits of the address word AW. A possible criterion consists in defining a bit in the address word AW as a significant bit when the bit of the same location in the tag word TW has a value of 0. As shown in the example of FIG. 1 the tag word transmitted on the tag bus is 0010010, therefrom defining significant bits of the address word, bits with the index S, and therefrom defining non-significant bits of the address word, bits with an index X. In this example, the significant bits are AW(0), AW(2), AW(3), AW(5), AW(6) and AW(7).

A unit FU is addressed when the significant bits of the address word, that were determined according to the manner previously described, match the bits of the same location in its address ADD. FIG. 2 depicts a transmitted address word AW(7:0), a transmitted tag word TW(7:0) and the resulting addresses of the units that are addressed. Let it be assumed that the address word AW transmitted on the address bus is 00100000. The tag bus carries the tag word TW of 0010010, and as said above, the significant bits defined by this tag word are AW(0), AW(2), AW(3), AW(5), AW(6) and AW(7) and the non-significant bits, indiced by an X are AW(1) and AW(4). A unit is addressed when the significant bits of the transmitted address word AW match the corresponding bits of the unit's address. In this example, the units addressed have an address 001X00X0, with X corresponding to do-not-care value. Thus, the units with the addresses ADD of 00100000, 00110000, 00110010, 00100010 are addressed. As a result, the tag word being associated to the address word allows to address, at a same time, several units among a plurality of units.

The system depicted in FIG. 1 further includes a data bus 3 connected to each unit FU1, FU2, FU3. Thus when the controller addresses several units at a time using a method in accordance with the invention, this data bus 3 allows to load at a same time a single command into these several addressed units. A unit may be a processor or a register.

Figure 3:
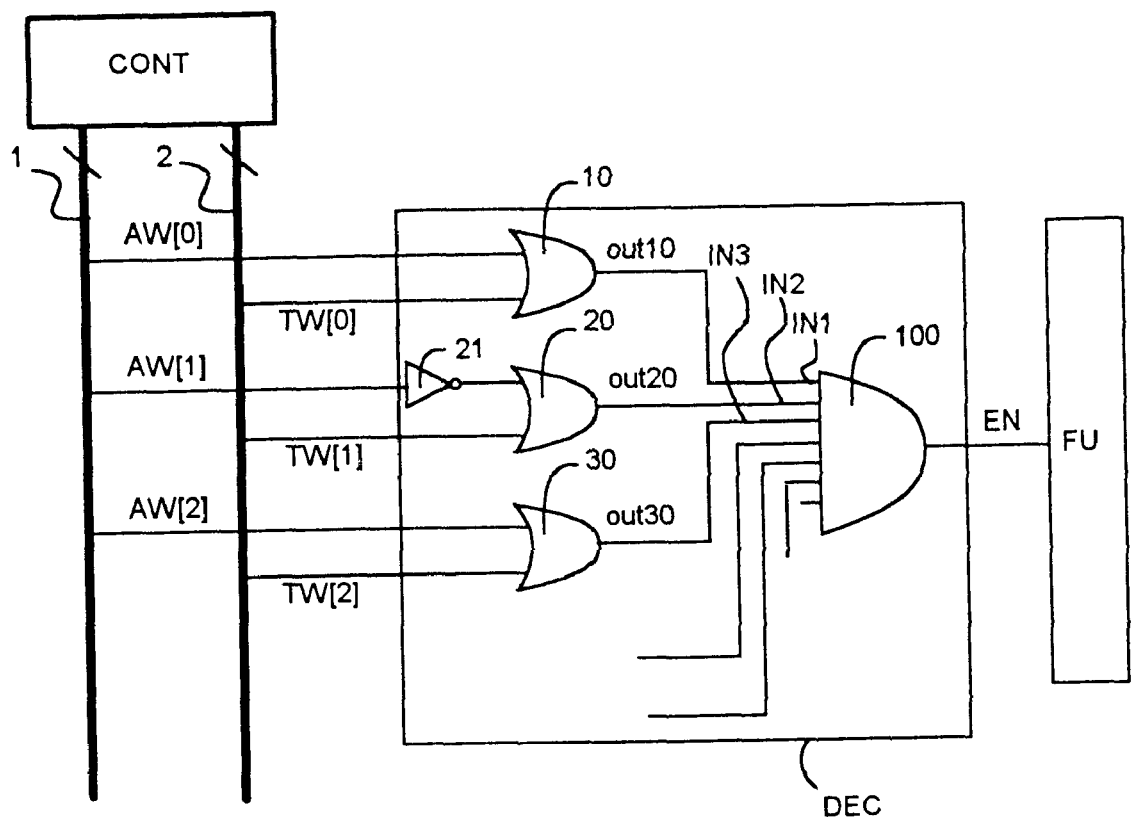
FIG. 3 is logic block diagram of an address decoder according to the invention.

A possible implementation of a decoder DEC using logic gates is partly represented in FIG. 3. The decoder DEC is associated to an addressable unit FU with an address ADR. The decoder DEC receives from the controller CONT the 8-bits words AW[7:0] and TW[7:0] transmitted by means of the address bus 1 and the tag bus 2, it determines bit by bit if the unit FU is addressed. It is shown in FIG. 3 only the elements of the decoder DEC dealing with the three lower bits of the address word AW, the tag word TW and the address of the unit ADR. It is assumed, in this embodiment of the invention that the three lower bits of the address of the unit ADR[2], ADR[1], ADR[0] are 1, 0 and 1, respectively.

It is shown in the decoder DEC of FIG. 3 an AND gate 100 delivering a signal enable EN to the unit FU. The AND gate 100 receives in its inputs the signals IN1, IN2, . . . IN8. The unit FU is addressed when the transmitted signal EN is 1, which leads to IN1, IN2 . . . IN8 all carrying a 1.

A logic OR gate 10 is responsible in the decoder DEC for the decoding of the bits AW[0] and TW[0]. Therefore the OR gate 10 receives in its inputs AW[0] and TW[0] and delivers an output out10. Output out10 is "1" when TW[0] is "1", the latter meaning that AW[0] is not a significant bit in the address word AW[7:0]. Output out10 is also "1" when TW[0] is 1, that is when TW[0] corresponds to ADR[0] of the unit's address. The output out10 is the input IN0 of the AND gate 100 with a value of 1 when the unit is addressed.

In the same manner, a logic OR gate 20 and an inverter 21 are responsible, in the decoder DEC, for the decoding of AW[1] and TW[1]. The output out20 is the input IN2 of the AND gate 100.

A logic OR gate 30 is responsible, in the decoder, for the decoding of AW[2] and TW[2]. The output out30 is the input IN3 of the AND gate 100.

The described embodiments are by no means a limitation of the invention. For example a system in accordance with the invention may comprise more or less than three units. As another example the decoders DEC1, DEC2 and DEC3 may be combined to form a single decoder for all the units.

What is claimed is:

1. A method of addressing units (FU1, FU2, FU3) amongst a plurality of units having different addresses (ADD1, ADD2, ADD3) by means of a single address word (AW), the addresses and the address word being composed of address elements, wherein the method comprises in series the steps of:

transmitting a tag word (TW) to the plurality of units, the tag word defining which address elements of the address word are significant (s) and which address elements of the address word are non-significant don't care values (x);

addressing more than one of the address units from the single address word (AW) by associating the tag word (TW) with the address word (AW) so that significant elements of the address word match with address bits of more than one of the address units that have a same value, and non-significant elements of the address word match with address bits of more than one of the address units having a complementary value, said non-significant bits being set as don't care values, and comparing the address word and the addresses of the units, a unit being addressed if the significant elements of the address word match the corresponding elements of the unit's address.

2. A method of addressing as claimed in claim 1, wherein the address elements are bits and the significant elements of the address word are the bits in the address word having the same location in the tag word as the bits of value zero.

3. A system having:

a plurality of addressable units (FU1, FU2, FU3) having different addresses (ADD1, ADD2, ADD3), the addresses being composed of address elements, wherein the system also comprises an addressing unit (CONT) for generating an address word (AW) composed of address elements and a associated tag word (TW), the tag word permitting more than one addressable unit being selected by the address word by defining which address elements of the address word are significant (s) and which address elements of the address word are non-significant (X);

a bus system (1,2) for conveying the address word and the associated tag word to the addressable units;

a decoder(DEC1, DEC2, DEC3) being associated to each addressable unit for comparing the address word and the address of the unit, the unit being addresses if the significant elements of the address word match the corresponding elements of the unit's address;

wherein the addressing unit generates the address word for selecting more than one of the addressable units by setting the tag word (TW) so that significant elements of the address word match with more than one of the addressable units, except for address elements having complementary values in said more than one of the addressable units, which are set to non-significant don't care values.

* * * * *